Jan. 3, 1933. E. C. HARNDEN 1,892,667
SHARPENER FOR SHARPENING BLADES OF LAWN MOWERS OR SHEARS
Filed April 19, 1932

Edwin C Harnden
Inventor

Patented Jan. 3, 1933

1,892,667

UNITED STATES PATENT OFFICE

EDWIN C. HARNDEN, OF WAVERLY, NEW YORK

SHARPENER FOR SHARPENING BLADES OF LAWN MOWERS OR SHEARS

Application filed April 19, 1932. Serial No. 606,201.

Figure 1:
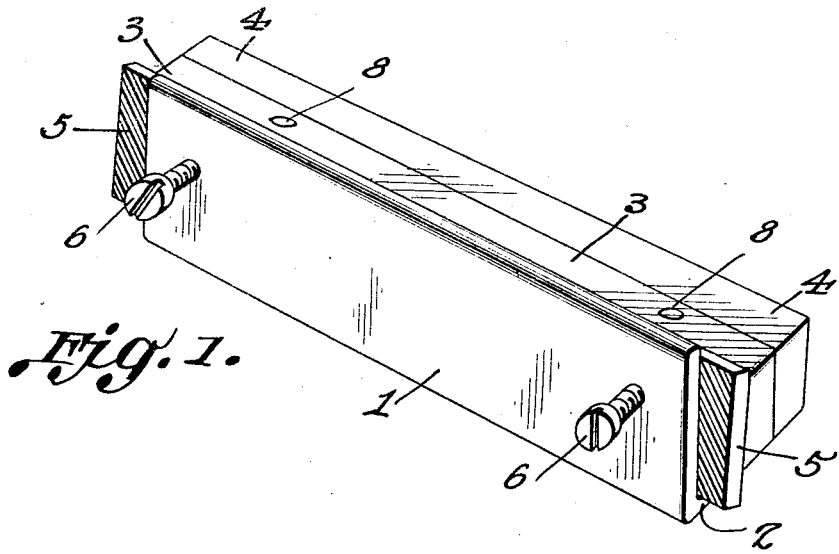
Fig. 1 is a perspective view of the sharpener.
Figure 2:
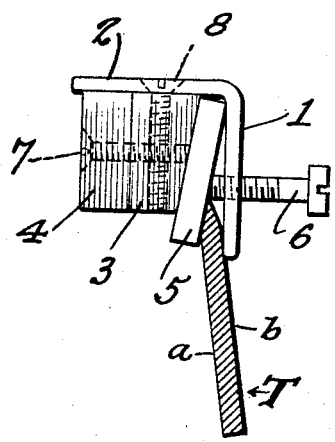
Figs. 2 and 3 are end views of the sharpener.
Figure 3:
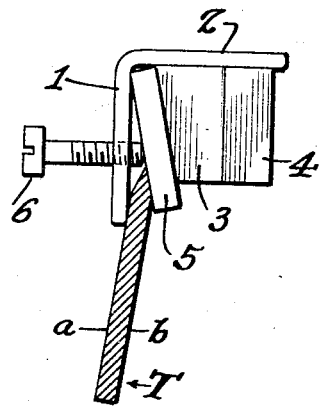

The sharpener consists of a section of angle iron 1, 2, top and side 1¼" wide, inside measure which is the frame of the device. A metal bar 3 ¾" wide by ½" deep at back $\frac{7}{16}$" at front with beveled top, is bolted to back of angle iron, with two bolts 8 with countersunk heads grooved for screw driver ¼" below inside of top angle. To this bar a bar 4 ¾" wide ⅜" deep is bolted with two bolts 7 with countersunk heads grooved for screw driver at bottom of the beveled bar. On the beveled bar is laid the cutting bar 5 1" wide by ¼" deep, which may be a file or emery bar of same dimensions, the bar 5 is held in place by the two bolts 6 as shown in the drawing, the top of bar being of same angle as edge of blade.

In using sharpener place face of metal bar 1 against face of blade with cutting bar 5 resting on edge of blade, press down on edge of blade and move forward and back until blade is sharpened. When using on lawn mower blades remove lower metal bar to avoid rivets used to fasten blade to mower.

What I claim as new and desire to secure by Letters Patent is:

A blade sharpener comprising a length of angle bar having elongated plate-like portions extending at substantially right angles to each other, an abutment block secured to one plate-like portion and formed with a flat surface spaced from and arranged at a slight angle to the plane of the other plate-like portion, a sharpening plate secured against the face of said abutment block and provided with a sharpening surface in a plane at a slight angle to the plane of the plate-like portion opposed thereto to form a wedge-shaped blade receiving space between the sharpening plate and one plate like portion of the angle bar.

EDWIN C. HARNDEN.